United States Patent
Lamusga et al.

(10) Patent No.: US 10,995,040 B2
(45) Date of Patent: May 4, 2021

(54) CERAMIC MATRIX COMPOSITE COMPONENTS HAVING A DELTOID REGION AND METHODS FOR FABRICATING THE SAME

(71) Applicant: Rolls-Royce High Temperature Composites, Inc., Huntington Beach, CA (US)

(72) Inventors: Joseph Lamusga, Long Beach, CA (US); Christopher Barrett, Huntington Beach, CA (US)

(73) Assignee: Rolls-Royce High Temperature Composites, Inc., Cypress, CA (US)

(*) Notice: Subject to any disclaimer, the term of this patent is extended or adjusted under 35 U.S.C. 154(b) by 817 days.

(21) Appl. No.: 15/456,628

(22) Filed: Mar. 13, 2017

(65) Prior Publication Data

US 2018/0230064 A1 Aug. 16, 2018

Related U.S. Application Data

(60) Provisional application No. 62/307,612, filed on Mar. 14, 2016.

(51) Int. Cl.
| | |
|---|---|
| *C04B 41/51* | (2006.01) |
| *C04B 35/80* | (2006.01) |
| *C04B 41/45* | (2006.01) |
| *C04B 41/50* | (2006.01) |
| *F01D 11/00* | (2006.01) |

(Continued)

(52) U.S. Cl.
CPC .......... *C04B 41/515* (2013.01); *C04B 35/573* (2013.01); *C04B 35/80* (2013.01); *C04B 35/806* (2013.01); *C04B 41/4584* (2013.01); *C04B 41/5096* (2013.01); *F01D 11/00* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/5252* (2013.01); *C04B 2235/5256* (2013.01); *C04B 2235/5268* (2013.01); *F01D 5/282* (2013.01); *F01D 5/284* (2013.01); *F05D 2240/11* (2013.01); *F05D 2250/11* (2013.01); *F05D 2250/23* (2013.01); *F05D 2300/222* (2013.01);

(Continued)

(58) Field of Classification Search
CPC ............................. C04B 35/80; C04B 41/4584
See application file for complete search history.

(56) References Cited

U.S. PATENT DOCUMENTS 5,632,834 A * 5/1997 Ostertag ................. B32B 18/00
156/173
5,955,391 A * 9/1999 Kameda ................ C04B 35/573
204/192.28

(Continued)

*Primary Examiner* — Matthew J Daniels
(74) *Attorney, Agent, or Firm* — Brinks Gilson & Lione

(57) ABSTRACT

A method for fabricating a ceramic matrix composite component having a deltoid region is provided. The method includes providing a porous ceramic preform. The porous ceramic preform includes a layer-to-layer weave of ceramic fibers that forms a modified layer-to-layer woven core and at least one 2-dimensional layer of ceramic fibers that is disposed adjacent to the modified layer-to-layer woven core. The porous ceramic preform is formed into a ceramic matrix composite body having the deltoid region such that the modified layer-to-layer woven core extends through the deltoid region.

18 Claims, 3 Drawing Sheets

(51) Int. Cl.
 *C04B 35/573* (2006.01)
 *F01D 5/28* (2006.01)
(52) U.S. Cl.
 CPC ............... *F05D 2300/6033* (2013.01); *F05D 2300/6034* (2013.01); *F05D 2300/614* (2013.01)

(56) References Cited

U.S. PATENT DOCUMENTS

| | | |
|---|---|---|
| 6,742,783 B1 | 6/2004 | Lawer et al. |
| 8,562,901 B1 * | 10/2013 | Mah ................ B28B 1/007 264/640 |
| 2005/0238491 A1 | 10/2005 | Morrison et al. |
| 2006/0130957 A1 | 6/2006 | Kostar et al. |
| 2008/0170945 A1 | 7/2008 | Barrett |
| 2009/0202763 A1 * | 8/2009 | Rose ................ B32B 5/024 428/36.1 |
| 2010/0015394 A1 | 1/2010 | Morrison et al. |
| 2013/0062808 A1 | 3/2013 | Bremmer et al. |
| 2013/0089429 A1 | 4/2013 | Nunez et al. |
| 2013/0243604 A1 | 9/2013 | Roussille et al. |
| 2014/0205463 A1 | 7/2014 | Herraiz et al. |
| 2015/0247412 A1 | 9/2015 | Le Hong |
| 2015/0251378 A1 | 9/2015 | Hillier |

\* cited by examiner

CERAMIC MATRIX COMPOSITE COMPONENTS HAVING A DELTOID REGION AND METHODS FOR FABRICATING THE SAME

CROSS-REFERENCE TO RELATED APPLICATIONS

This application is a non-provisional application of, and claims priority under 35 USC § 119(e) to, U.S. provisional application 62/307,612, "CERAMIC MATRIX COMPOSITE COMPONENTS HAVING A DELTOID REGION AND METHODS FOR FABRICATING THE SAME" filed Mar. 14, 2016, the entire contents of which are incorporated by reference.

TECHNICAL FIELD

The present disclosure relates generally to ceramic matrix composite (CMC) components, and more particularly to CMC components having a deltoid region that is reinforced with a modified layer-to-layer woven core and methods for fabricating such CMC components.

BACKGROUND

Ceramic matrix composites (CMC) are used for making components for relatively high-strength (for example, high-pressure), high-temperature applications such as for various components in gas turbines and the like. The components may be fabricated by laminating multiple layers of ceramic fibers in a ceramic matrix to form a structure that includes CMC walls. In such constructions, the ceramic fibers effectively act as load bearing members and the ceramic matrix effectively acts as a load transferring mechanism for transferring the load between the load bearing members when the CMC component is stressed.

Some CMC components are configured having two or more non-parallel (for example, transverse or perpendicular), intersecting walls. Current methods for forming such CMC components typically involve laying up multiple layers of ceramic fibers to form the two or more walls. At or proximate the area in which the walls intersect, a deltoid region (for example, an enclosed component section typically having a substantially triangular-shaped cross-section) is formed adjacent to where the layers of ceramic fibers bend to form the intersecting walls. Unfortunately, it can be difficult to position ceramic fibers in the deltoid region due to bending radii of the layers of ceramic fibers. Rather, the deltoid region is often filled primarily with the ceramic matrix material and can be void or only partially filled with reinforcing ceramic fibers (for example, deltoid "noodle" filler(s)). As such, the deltoid region of the CMC component may be rich in ceramic matrix material but substantially deficient in reinforcing ceramic fibers, thereby resulting in the deltoid region having less than desirable mechanical and/or structural properties.

Accordingly, it is desirable to provide CMC components having a deltoid region with improved mechanical and/or structural properties and methods for fabricating such CMC components. Furthermore, other desirable features and characteristics of the present disclosure will become apparent from the subsequent detailed description and the appended claims, taken in conjunction with the accompanied drawings and this background.

BRIEF SUMMARY

Ceramic matrix composite components having a deltoid region and methods for fabricating such ceramic matrix composite components are provided herein. In accordance with an exemplary embodiment, a method for fabricating a ceramic matrix composite component having a deltoid region includes providing a porous ceramic preform. The porous ceramic preform includes a layer-to-layer weave of ceramic fibers that forms a modified layer-to-layer woven core and at least one 2-dimensional layer of ceramic fibers that is disposed adjacent to the modified layer-to-layer woven core. The porous ceramic preform is formed into a ceramic matrix composite body having the deltoid region such that the modified layer-to-layer woven core extends through the deltoid region.

In accordance with another exemplary embodiment, a ceramic matrix composite component having a deltoid region is provided. The ceramic matrix composite component includes a ceramic matrix composite body having the deltoid region. The ceramic matrix composite body includes a modified layer-to-layer woven core of ceramic fibers and at least one 2-dimensional layer of ceramic fibers disposed adjacent to the modified layer-to-layer woven core. The modified layer-to-layer woven core extends through the deltoid region.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
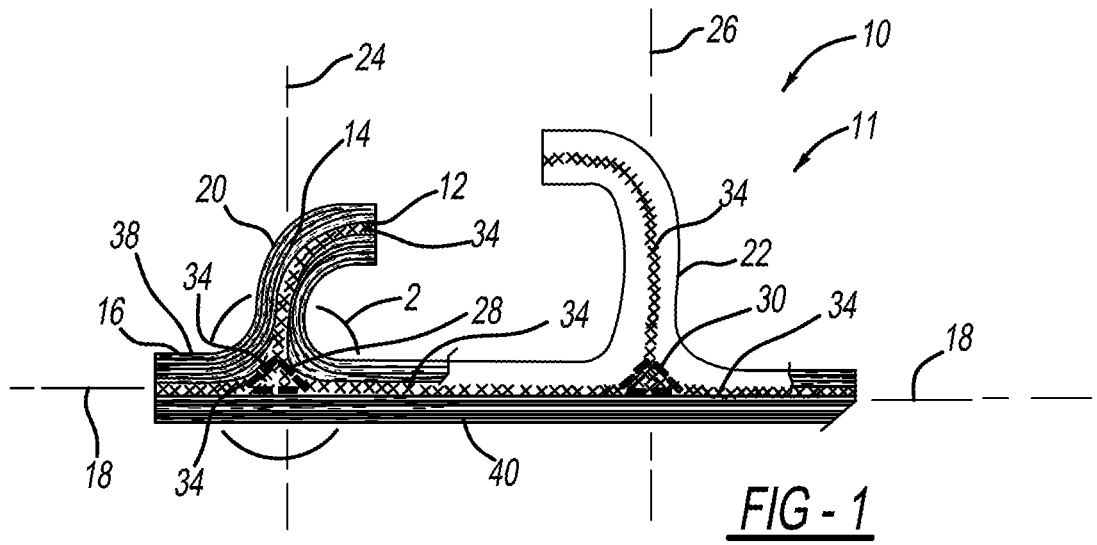
FIG. 1 is a sectional view of a ceramic matrix composite component in accordance with an exemplary embodiment.

The following detailed description is merely exemplary in nature and is not intended to limit the disclosure or the application and uses of the disclosure. Furthermore, there is no intention to be bound by any theory presented in the preceding background or the following detailed description.

Various embodiments contemplated herein relate to ceramic matrix composite (CMC) components having a deltoid region and methods for fabricating such CMC components. The exemplary embodiments taught herein provide a porous ceramic preform. The porous ceramic preform includes a layer-to-layer weave (for example, a generally orthogonal woven structure) of ceramic fibers that forms a modified layer-to-layer woven core and at least one 2-dimensional layer of ceramic fibers that is disposed adjacent to the modified layer-to-layer woven core (for example, a generally orthogonal woven structure for extending through an interior mid-section or core of the CMC component). As used herein, the phrase "modified layer-to-layer" refers to a 2.5 dimensional and/or a 3-dimensional layer-to-layer weave.

In an exemplary embodiment, the layer-to-layer weave of ceramic fibers is a 2.5-dimensional or 3-dimensional weave of ceramic fibers. As used herein, a 2.5-dimensional or 3-dimensional weave is understood to mean a generally orthogonal woven structure containing a first set of layers of fibers lying in and/or substantially parallel to an X-Y plane defined by an X-axis and a Y-axis, and a second set of fibers lying in and/or substantially parallel to a Z-axis (for example, axis perpendicular to X-Y plane) and woven through the first set of layers of fibers. In particular, in a 3-dimensional weave, all of the fibers of the second set lying in and/or substantially parallel to the Z-axis are each woven through all of the first set of layers of fibers lying in and/or substantially parallel to the X-Y plane. In a 2.5-dimensional weave, various fibers of the second set lying in and/or substantially parallel to the Z-axis are woven through different layers of the first set of layers of fibers lying in and/or substantially parallel to the X-Y plane such that all of the first set of layers of fibers are woven to various fibers of the second set.

The porous ceramic preform is formed into a ceramic matrix composite body having the deltoid region such that the modified layer-to-layer woven core extends through the deltoid region. In an exemplary embodiment, the ceramic matrix composite body is formed by infiltrating a molten metal or alloy (for example, silicon metal, silicon metal alloy, or other ceramic material or alloy) into the porous ceramic preform and solidifying the molten metal or alloy to form a ceramic matrix that encapsulates or fills the porous ceramic preform. It has been found that by using a 2.5-dimensional or 3-dimensional weave of ceramic fibers to form the modified layer-to-layer woven core, the deltoid region is sufficiently reinforced with ceramic fibers along multiple axes or directions (for example, along the X-, Y-, and Z-axes) for enhancing and/or improving the mechanical and/or structural properties of the deltoid region.

Figure 2A:
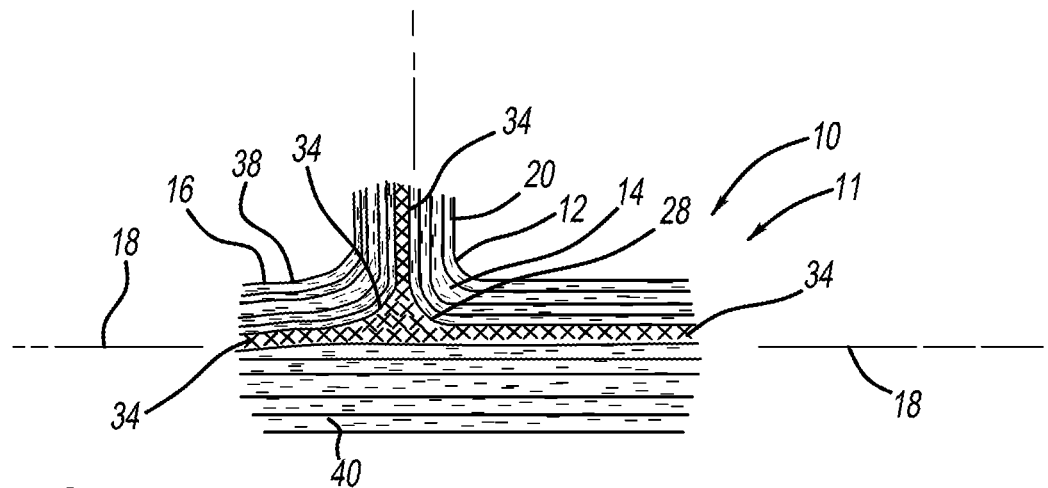
FIG. 2a is an enlarged portion of the ceramic matrix composite component depicted in region 2 of FIG. 1.
Figure 2B:
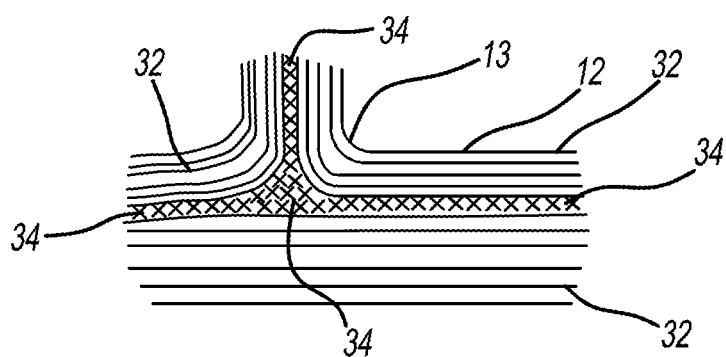
FIG. 2b is an enlarged portion of a porous ceramic preform corresponding to region 2 depicted in FIG. 1 in accordance with an exemplary embodiment.

FIG. 1 is a sectional view of a ceramic matrix composite component 10 that includes a ceramic matrix composite body 11 in accordance with an exemplary embodiment. FIG. 2a is an enlarged portion of the ceramic matrix composite body 11 that is depicted in region 2 of FIG. 1 and that includes a ceramic preform 12, the porosity of which has been filled, densified, and/or otherwise infiltrated with a continuous or substantially continuous ceramic matrix 14. FIG. 2b is an enlarged portion of the ceramic preform 12, prior to introduction of the ceramic matrix 14 and is therefore porous (also referred to herein as a porous ceramic preform 13), corresponding to region 2 of the ceramic matrix composite body 11 depicted in FIG. 1 during an intermediate fabrication stage of the ceramic matrix composite component 10.

Referring to FIGS. 1-2a, the ceramic matrix composite component 10 may be a component of a gas turbine engine such as forming at least part of a seal segment, a combustion liner, a turbine blade, a turbine vane, or another other part(s) that may be subjected to intense heat and/or pressure. In an exemplary embodiment, the ceramic matrix composite component 10 forms at least part of a seal segment of a gas turbine engine.

As illustrated, the ceramic matrix composite body 11 includes a base wall 16 that extends generally in an X-Y plane 18 and generally transverse walls 20 and 22 that extend from the base wall 16 correspondingly generally in $Z_1$ and $Z_2$ planes 24 and 26 that are substantially transverse to the X-Y plane 18. At or proximate the corresponding intersections of the X-Y and $Z_1$ and $Z_2$ planes 18, 24, and 26 are deltoid regions 28 and 30 (indicated by dashed lines in FIG. 1). As used herein, a deltoid region is understood to mean a closed interior section (e.g., cavity) of the ceramic matrix composite body 11 formed between non-parallel, intersecting walls adjacent to where the outer sections of the ceramic matrix composite body 11 bend (for example, or change direction) to form the intersecting walls. In a specific example, a deltoid region can be a small cavity created by adjacent sub-laminates due to the fabric bend radius not allowing true conformance to the volume needed to be filled. This region has generally a substantially triangular cross-sectional shape, but can be also more square in cross-sectional shape depending on how many sub-laminates are coming together.

Referring to FIGS. 1-2b and as will be discussed in further detail below, the ceramic matrix composite body 11 is formed from the porous ceramic preform 13 that has been filled, densified, and/or otherwise infiltrated with the continuous or substantially continuous ceramic matrix 14. The porous ceramic preform 13 includes ceramic fibers 32. The porous ceramic preform 13 may be an arrangement of the ceramic fibers 32. The arrangement may be fixed in a desired shape.

In some examples, each of the ceramic fibers 32 may be a bundle and/or a tow of ceramic fibers. The fibers in each bundle or tow may be braided or otherwise arranged.

The ceramic fibers 32 may comprise a material that is stable at temperatures above 1000 degrees Celsius (° C.). Examples of the ceramic fibers 32 may include fibers of alumina, mullite, silicon carbide, zirconia or carbon. The ceramic fibers 32 may not be organic, metallic or glass fibers.

In an exemplary embodiment, the porous ceramic preform 13 includes a layer-to-layer weave of the ceramic fibers 32 that forms a modified layer-to-layer woven core 34 and one or more 2-dimensional layers of ceramic fibers 36 disposed adjacent to (for example, over and/or under) the modified layer-to-layer woven core 34. In one example, the modified layer-to-layer woven core 34 includes a 2.5-dimensional weave of the ceramic fibers. In another example, the modified layer-to-layer woven core 34 includes a 3-dimensional weave of the ceramic fibers.

The one or more 2-dimensional layers of ceramic fibers 36 may include a layer or layers of 2-dimensional weave of ceramic fibers. In one example, the 2-dimensional layers of ceramic fibers 36 include a plurality of 2-dimensional layers of ceramic fibers that are stacked or laid-up to form a layup. Alternatively, the one or more 2-dimensional layers of ceramic fibers 36 may include a layer or layers of unidirectional ceramic fibers. In one example, the 2-dimensional layers of ceramic fibers 36 includes a plurality of layers of unidirectional ceramic fibers that are stacked or laid-up to form a layup in which each layer of the unidirectional ceramic fibers is oriented independent of or substantially parallel to the unidirectional ceramic fibers in an adjacent layer.

The ceramic matrix composite body 11 may comprise, for example, a silicon carbide ceramic matrix composite. The ceramic matrix composite body 11 may have various shapes or forms, not just the shape illustrated in FIG. 1, but will include at least two non-parallel (for example, transverse or perpendicular), intersecting walls.

Forming the ceramic matrix composite body 11 from the porous ceramic preform 13 may include infiltrating a molten metal or alloy (for example, a silicon metal or alloy) into the porous ceramic preform 13. The molten metal or alloy is then solidified, for example, via cooling, sintering, and/or the like to form the ceramic matrix 14. In one example, the silicon metal or alloy fills the gaps, pores, and/or voids between the ceramic fibers of the porous ceramic preform 13 to form a continuous or substantially continuous ceramic matrix 14 that is reinforced with the ceramic preform 12. The silicon metal or alloy may also react with a reactive element source present in the ceramic preform 12 to form additional silicon based ceramic matrix material. In some examples, a chemical vapor infiltration coating may be applied to the porous ceramic preform 13 prior to the melt infiltration to stiffen the ceramic fibers. Alternatively or in addition, forming the ceramic matrix composite body 11 from the porous ceramic preform 13 may include chemical vapor infiltrating the porous ceramic preform 13 instead of melt infiltrating a material into the porous ceramic preform 13.

Referring to FIGS. 1-2a, the ceramic matrix composite body 11 is formed with the modified layer-to-layer woven core 34 extending through the intersections of the X-Y and $Z_1$ and $Z_2$ planes 18, 24, and 26 and into the interior mid-sections of the base wall 16 and the generally transverse walls 20 and 22. As such, in an exemplary embodiment, the deltoid regions 28 and 30 include the ceramic matrix 14 reinforced with the ceramic fibers 32 of the modified layer-to-layer woven core 34 extending through the deltoid regions 28 and 30 along multiple axes or directions of the X-Y and $Z_1$ and $Z_2$ planes 18, 24, and 26 for enhancing and/or improving the mechanical and/or structural properties of the deltoid regions 28 and 30.

In an exemplary embodiment, the modified layer-to-layer woven core 34 has from about 15 to about 50 volume percent (vol. %) of the ceramic fibers 32 in the deltoid regions 28 and 30 based on a total volume of the deltoid regions 28 and 30. In an exemplary embodiment, the modified layer-to-layer woven core 34 has from about 15 to about 20 vol. % of the ceramic fibers 32 extending longitudinally in the deltoid regions 28 and 30 generally in the $Z_1$ and $Z_2$ planes 24 and 26, respectively, based on a total volume of ceramic fibers 32 in the deltoid regions 28 and 30. In an exemplary embodiment, the modified layer-to-layer woven core 34 has from about 80 to about 85 vol. % of the ceramic fibers 32 extending longitudinally in the deltoid regions 28 and 30 generally in the X-Y plane 18, based on the total volume of ceramic fibers 32 in the deltoid regions 28 and 30. In an exemplary embodiment, the base wall 16 and, independently, the generally transverse walls 20 and 22 have an overall thickness of from about 0.175 to about 0.225 inches and the modified layer-to-layer woven core 34 has a thickness of from about 0.030 to about 0.050 inches in the base wall 16 and, independently, in the generally transverse walls 20 and 22.

As illustrated in FIGS. 1-2a, the 2-dimensional layers of ceramic fibers 36 may include a first layup of a plurality of 2-dimensional layers of ceramic fibers 38 and a second layup of a plurality of 2-dimensional layers of ceramic fibers 40. The modified layer-to-layer woven core 34 is disposed between the first and second layups of the 2-dimensional layers of ceramic fibers 38 and 40. The first layup of the 2-dimensional layers of ceramic fibers 38 extends over the deltoid regions 28 and 30 from the base wall 16 to the generally transverse walls 20 and 22. The second layup of the 2-dimensional layers of ceramic fibers 40 extends under the deltoid regions 28 and 30 along the base wall 16.

Figure 3:
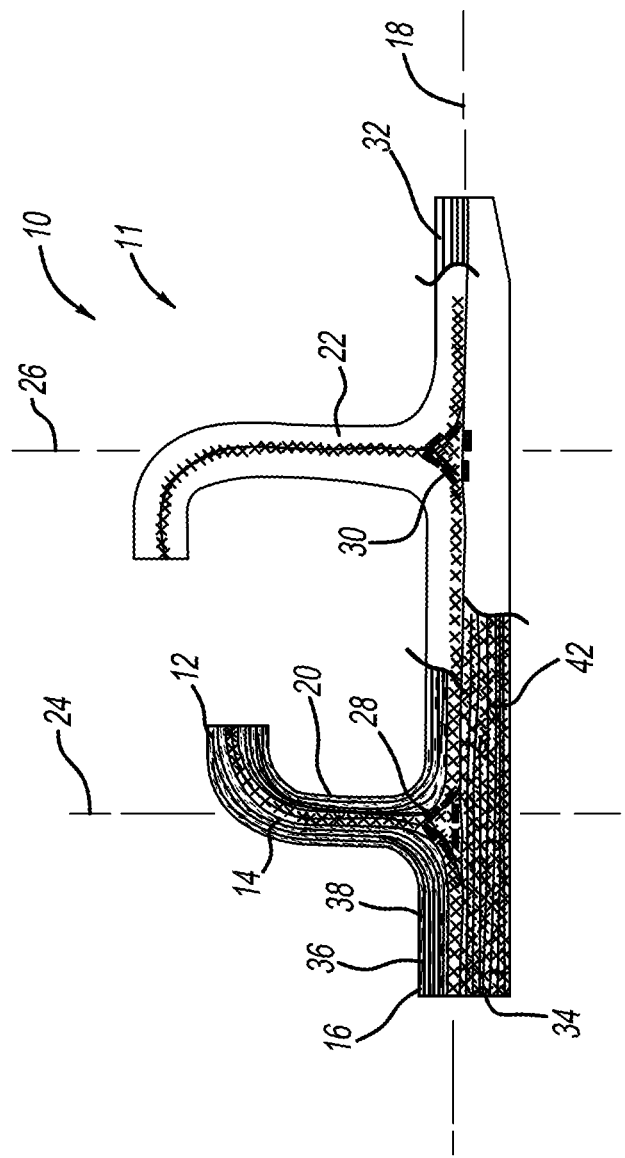
FIG. 3 is a sectional view of a ceramic matrix composite component in accordance with another exemplary embodiment.

Referring to FIG. 3, in an alternative embodiment, the ceramic matrix composite body 11 includes the first layup of the 2-dimensional layers of ceramic fibers 38 that overlies the modified layer-to-layer woven core 34 but not a lower 2-dimensional layer(s) of ceramic fibers that otherwise would extend under the deltoid regions 28 and 30. In particular, the first layup of the 2-dimensional layers of ceramic fibers 38 extends over the deltoid regions 28 and 30 from the base wall 16 to the generally transverse walls 20 and 22. The modified layer-to-layer woven core 34 extends through and under the deltoid regions 28 and 30 to an outer base wall surface 42 under the deltoid regions 28 and 30. In an exemplary embodiment, the base wall 16 and, independently, the generally transverse walls 20 and 22 have an overall thickness of from about 0.175 to about 0.225 inches and the modified layer-to-layer woven core 34 has a thickness less than the overall thickness but greater than zero in the base wall 16.

Figure 4:
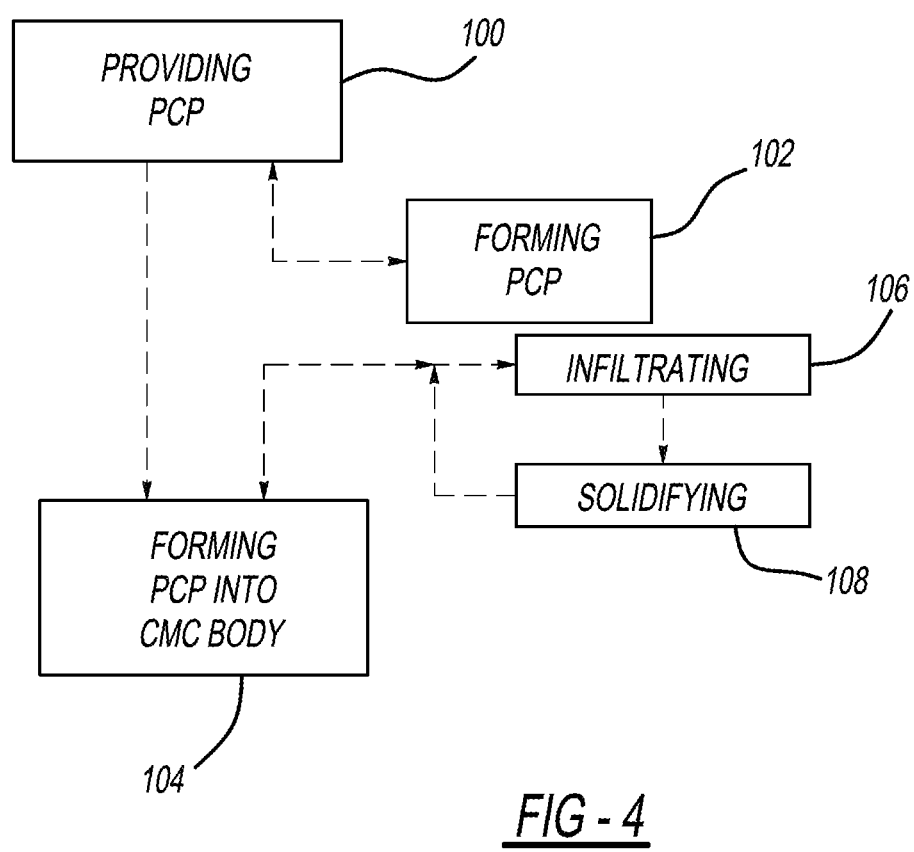
FIG. 4 is a flow diagram of an exemplary method for fabricating a ceramic matrix composite component.

FIG. 4 is a flow diagram of an exemplary method for fabricating a ceramic matrix composite component having a deltoid region. The method may include additional, different, or fewer operations than illustrated in FIG. 4. The operations may be executed in a different order than illustrated in FIG. 4.

As illustrated, the method includes providing a porous ceramic preform (Step 100). The porous ceramic preform includes a layer-to-layer weave of ceramic fibers that forms a modified layer-to-layer woven core and at least one 2-dimensional layer of ceramic fibers that is disposed adjacent to the modified layer-to-layer woven core. In an exemplary embodiment, providing the porous ceramic preform includes forming the porous ceramic preform (Step 102) by arranging the at least one 2-dimensional layer of ceramic fibers over and directly on the modified layer-to-layer woven core.

The porous ceramic preform is formed into a ceramic matrix composite body (Step 104) having the deltoid region such that the modified layer-to-layer woven core extends through the deltoid region. In an exemplary embodiment, forming the porous ceramic preform into the ceramic matrix composite body includes infiltrating (Step 106) a molten metal or alloy into the porous ceramic preform and solidifying (108) the molten metal or alloy to form the ceramic matrix composite body.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

What is claimed is:
1. A method for fabricating comprising:
providing a porous ceramic preform comprising a layer-to-layer weave of ceramic fibers that forms a modified layer-to-layer woven core and at least one 2-dimensional layer of ceramic fibers disposed adjacent to the modified layer-to-layer woven core; and forming the porous ceramic preform into a ceramic matrix composite body that comprises: a base wall generally in an X-Y plane; a first wall and a second wall that each extend from the base wall and are generally transverse to the X-Y plane, the first wall generally extending in a first Z plane and the second wall generally extending in a second Z plane; a first deltoid region disposed at or proximate an intersection of the X-Y plane and the first Z plane; a second deltoid region disposed at or proximate an intersection of the X-Y plane and the second Z-plane, wherein the porous ceramic preform is formed into the ceramic matrix composite body such that the modified layer-to-layer woven core extends through the first deltoid region, through the second deltoid region, and into an interior mid-section of the base wall from the first deltoid region to the second deltoid region.

2. The method of claim 1, wherein providing the porous ceramic preform comprises providing the modified layer-to-layer woven core comprising a 2.5-dimensional weave of ceramic fibers.

3. The method of claim 1, wherein providing the porous ceramic preform comprises providing the modified layer-to-layer woven core comprising a 3-dimensional weave of ceramic fibers.

4. The method of claim 1, wherein providing the porous ceramic preform comprises providing the at least one 2-dimensional layer of ceramic fibers comprising a layer of 2-dimensional weave of ceramic fibers.

5. The method of claim 4, wherein providing the porous ceramic preform comprises providing the at least one 2-dimensional layer of ceramic fibers comprising a layup that includes a plurality of layers of the 2-dimensional weave of ceramic fibers.

6. The method of claim 1, wherein providing the porous ceramic preform comprises providing the at least one 2-dimensional layer of ceramic fibers comprising a layer of unidirectional ceramic fibers.

7. The method of claim 6, wherein providing the porous ceramic preform comprises providing the at least one 2-dimensional layer of ceramic fibers comprising a layup that includes a plurality of layers of the unidirectional ceramic fibers, wherein the unidirectional ceramic fibers in each layer are oriented independent of or substantially parallel to the unidirectional ceramic fibers in an adjacent layer.

8. The method of claim 1, wherein providing and forming the porous ceramic preform into the ceramic matrix composite body comprises providing the modified layer-to-layer woven core having from about 15 to about 50 vol. % of the ceramic fibers in the deltoid region based on a total volume of the deltoid region.

9. The method of claim 1, wherein the porous ceramic preform is formed into the ceramic matrix composite further such that the modified layer-to-layer extends into interior mid-sections of the first wall and the second wall.

10. The method of claim 9, wherein providing and forming the porous ceramic preform into the ceramic matrix composite body comprises providing the modified layer-to-layer woven core having from about 15 to about 20 vol. % of the ceramic fibers extending longitudinally in the deltoid region generally in the Z plane, based on a total volume of ceramic fibers in the deltoid region, and from about 80 to about 85 vol. % of the ceramic fibers extending longitudinally in the deltoid region generally in the X-Y plane, based on the total volume of ceramic fibers in the deltoid region.

11. The method of claim 9, wherein forming the ceramic matrix composite body comprises forming the base wall and, independently, the generally transverse wall having an overall thickness of from about 0.175 to about 0.225 inches, and wherein providing and forming the porous ceramic preform into the ceramic matrix composite body comprises providing the modified layer-to-layer woven core having a thickness of from about 0.030 to about 0.050 inches in the base wall and, independently, in the generally transverse wall.

12. The method of claim 9, wherein the at least one 2-dimensional layer of ceramic fibers comprises a first 2-dimensional layer and a second 2-dimensional layer of ceramic fibers, wherein providing the porous ceramic preform comprises arranging the modified layer-to-layer woven core between the first and second 2-dimensional layers of ceramic fibers, and wherein forming the ceramic matrix composite body comprises forming the ceramic matrix composite body such that the first 2-dimensional layer of ceramic fibers extends over the deltoid region from the base wall to the generally transverse wall and the second 2-dimensional layer of ceramic fibers extends under the deltoid region along the base wall.

13. The method of claim 9, wherein providing the porous ceramic preform comprises arranging the at least one 2-dimensional layers of ceramic fibers overlying the modified layer-to-layer woven core, and wherein forming the ceramic matrix composite body comprises forming the ceramic matrix composite body such that the at least one 2-dimensional layer of ceramic fibers extends generally over the deltoid region from the base wall to the generally transverse wall and the modified layer-to-layer woven core extends through and under the deltoid region to an outer base wall surface under the deltoid region.

14. The method of claim 1, wherein the ceramic fibers of the modified layer-to-layer woven core and/or the at least one 2-dimensional layer comprise fibers of alumina, mullite, silicon carbide, zirconia or carbon.

15. The method of claim 1, wherein the ceramic matrix composite body is a component of a gas turbine engine.

16. The method of claim 1, wherein the ceramic matrix composite body is at least a portion of a seal segment of a gas turbine engine.

17. A method for fabricating a ceramic matrix composite component, the method comprising:

providing a porous ceramic preform comprising a layer-to-layer weave of ceramic fibers that forms a modified layer-to-layer woven core and at least one 2-dimensional layer of ceramic fibers disposed adjacent to the modified layer-to-layer woven core; and forming the porous ceramic preform into a ceramic matrix composite body comprising a base wall that extends generally in an X-Y plane, a generally transverse wall that extends from the base wall generally in a Z plane that is substantially transverse to the X-Y plane, and a deltoid region disposed at or proximate an intersection of the X-Y plane and the Z plane, wherein the porous ceramic preform is formed into the ceramic matrix composite body such that:

the modified layer-to-layer woven core extends through the deltoid region, through the intersection of the X-Y plane and the Z plane, and into interior mid-sections of the base wall and the generally transverse wall; and the modified layer-to-layer woven core having from about 15 to about 20 vol. % of the ceramic fibers extending longitudinally in the deltoid region generally in the Z plane, based on a total volume of ceramic fibers in the deltoid region, and from about 80 to about 85 vol. % of the ceramic fibers extending longitudinally in the deltoid region generally in the X-Y plane, based on the total volume of ceramic fibers in the deltoid region.

18. A method for fabricating a ceramic matrix composite component, the method comprising:
providing a porous ceramic preform comprising a layer-to-layer weave of ceramic fibers that forms a modified layer-to-layer woven core and at least one 2-dimensional layer of ceramic fibers disposed adjacent to the modified layer-to-layer woven core; and
forming the porous ceramic preform into a ceramic matrix composite body comprising a base wall that extends generally in an X-Y plane, a generally transverse wall that extends from the base wall generally in a Z plane that is substantially transverse to the X-Y plane, and a deltoid region disposed at or proximate an intersection of the X-Y plane and the Z plane,
wherein the porous ceramic preform is formed into the ceramic matrix composite body such that the modified layer-to-layer woven core extends through the deltoid region, through the intersection of the X-Y plane and the Z plane, and into interior mid-sections of the base wall and the generally transverse wall, and
wherein forming the ceramic matrix composite body comprises forming the base wall and, independently, the generally transverse wall having an overall thickness of from about 0.175 to about 0.225 inches, and wherein providing and forming the porous ceramic preform into the ceramic matrix composite body comprises providing the modified layer-to-layer woven core having a thickness of from about 0.030 to about 0.050 inches in the base wall and, independently, in the generally transverse wall.

* * * * *